S. G. POMEROY.
Cultivator.
No. 224,039. Patented Feb. 3, 1880.
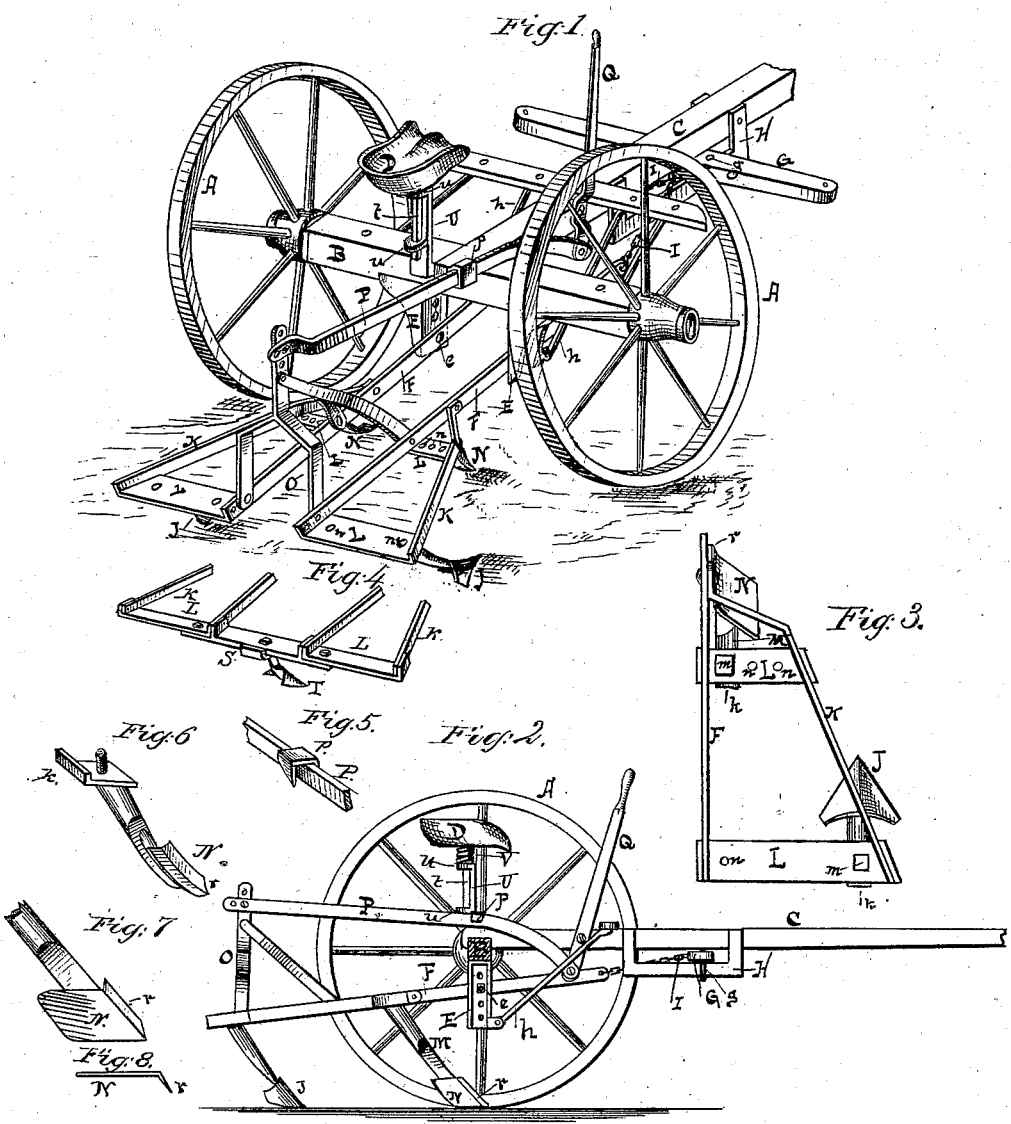

UNITED STATES PATENT OFFICE.

SENECA G. POMEROY, OF KING'S FERRY, NEW YORK.

CULTIVATOR.

SPECIFICATION forming part of Letters Patent No. 224,039, dated February 3, 1880.

Application filed March 11, 1879.

*To all whom it may concern:*

Be it known that I, SENECA G. POMEROY, of King's Ferry, in the county of Cayuga, in the State of New York, have invented a new and useful Improvement in Cultivators, of which the following is a specification.

This invention relates to that class of cultivators known as "sulky" or "riding" cultivators, wherein the cultivator-beams are attached to a wheeled frame or sulky, upon which the attendant rides during its operation; and it consists in the manner of attaching the cultivator draft-beams to the sulky and to the draft-rods, so that the strain of the draft will tend to depress the plows and keep them in the ground.

That others may fully understand my invention, I will particularly describe it, having reference to the accompanying drawings, wherein—

Figure 1 is a perspective view of my machine. Fig. 2 is a sectional side elevation of the same. Fig. 3 is a plan of the shovel-frame. Figs. 5 to 8 are perspective views of details.

A A are the supporting-wheels, and B is the axle upon which they are mounted. C is the draft-tongue; and D is the driver's seat, mounted upon a supporting-standard, U, which is fixed to the main frame of the cultivator. The standard U is provided with lugs $u\,u$, through which rectangular holes are made to receive a similarly-shaped bar, $t$, the upper end of which is rigidly fixed to the under side of the seat D. The seat is therefore readily removable, and may move also up and down, the bar $t$ sliding freely in the holes in the lugs $u\,u$; but the angular form of said bar and its guiding-holes will not permit the seat to swivel or turn around. A spring, V, is placed around the bar $t$, between the seat and the top of the standard D, to make said seat elastic.

Two brackets, E, are bolted to the lower side of the axle, near its middle, for the attachment of the cultivator-beams F. These brackets are supported by braces $h$.

The beams F, I prefer to make of wrought-iron; but they may be made of other suitable material. They are severally secured to the brackets E by bolts $e$, which form pivotal connections for said beams at a point some distance back from their front ends.

The double-tree G is adjusted to slide in a loop or loops, H, attached to the draft-tongue, and is connected directly to the front ends of the plow-beams by means of chains or rods I, so that the draft-strain is transmitted directly to the cultivator-beams without being transmitted through the sulky-frame. The double-tree is kept in place laterally by any convenient means; but two pins, $g$, are cheap and effective, as there is but little strain upon it in a lateral direction.

The beams F are secured to the brackets E some distance from their forward ends; and as the double-tree and draft are upward from the point of draft attachment close to the forward ends, it follows that there is a constant upward strain upon said forward ends and a corresponding downward pressure upon the rear ends and upon the cultivator-teeth J J, which are thereby kept to the ground without supervision on the part of the attendant. This downward pressure may be regulated by adjusting the cultivator-beams up or down on the brackets E, for which purpose a slot or a series of bolt-holes are provided.

Behind the point of attachment of the plow-beam to the bracket a side beam, K, is attached, and transverse plates L are secured to each for the attachment of the standards M, to the lower ends of which the teeth N are secured. The plates L are flat plates, and are perforated with holes $n$ for the passage of the bolt $m$, which secures the standard M. These standards have flat seats at their upper ends, with a flange, $k$, along one edge to engage with the edge of the plate L, and form one of the points of bearing for the standard, while the bolt $m$ forms the other.

A bridge-piece, O, is attached at its ends to the two cultivator-beams, and at its middle to the lifting-rod P, which is attached at its front end to the pivoted lever Q, whereby the cultivator may be raised clear of the ground for transportation from place to place.

A catch, $p$, is placed on the rod P, and the lever Q may be pushed backward until it engages therewith, when it will be held in that position and the cultivator suspended.

The tooth N is made of cast or wrought metal, as may be preferred, and on the inner edge, or that next the row of plants, its edge is turned forward, so as to constitute a colter-edge, $r$, to cut and divide the soil to be disturbed by the tooth from that to be left undisturbed. The edge r also serves to prevent clods from falling upon the tender plants which are under treatment.

Sometimes it is desired to scarify and disturb the entire surface of the ground, and a bridge-plate, S, is then bolted to the plates L L, so as to span the distance between the beams F and permit the attachment of an extra tooth, T, to operate in the middle between the beams.

Having described my invention, what I claim as new is—

1. A sulky-frame provided with brackets E and the sliding double-tree, combined with the cultivator-beams F, pivoted to said bracket between the point of draft attachment and the point of attachment of the standard M.

2. The sulky-frame and the cultivator-beams F, pivoted thereto at a point between the draft attachment and the standard attachment, as set forth, combined with the sliding double-tree above the forward ends of said beams and the connecting chain or rod.

SENECA G. POMEROY.

Witnesses:
D. W. ADAMS,
WM. S. MASON.